Patented Dec. 22, 1942

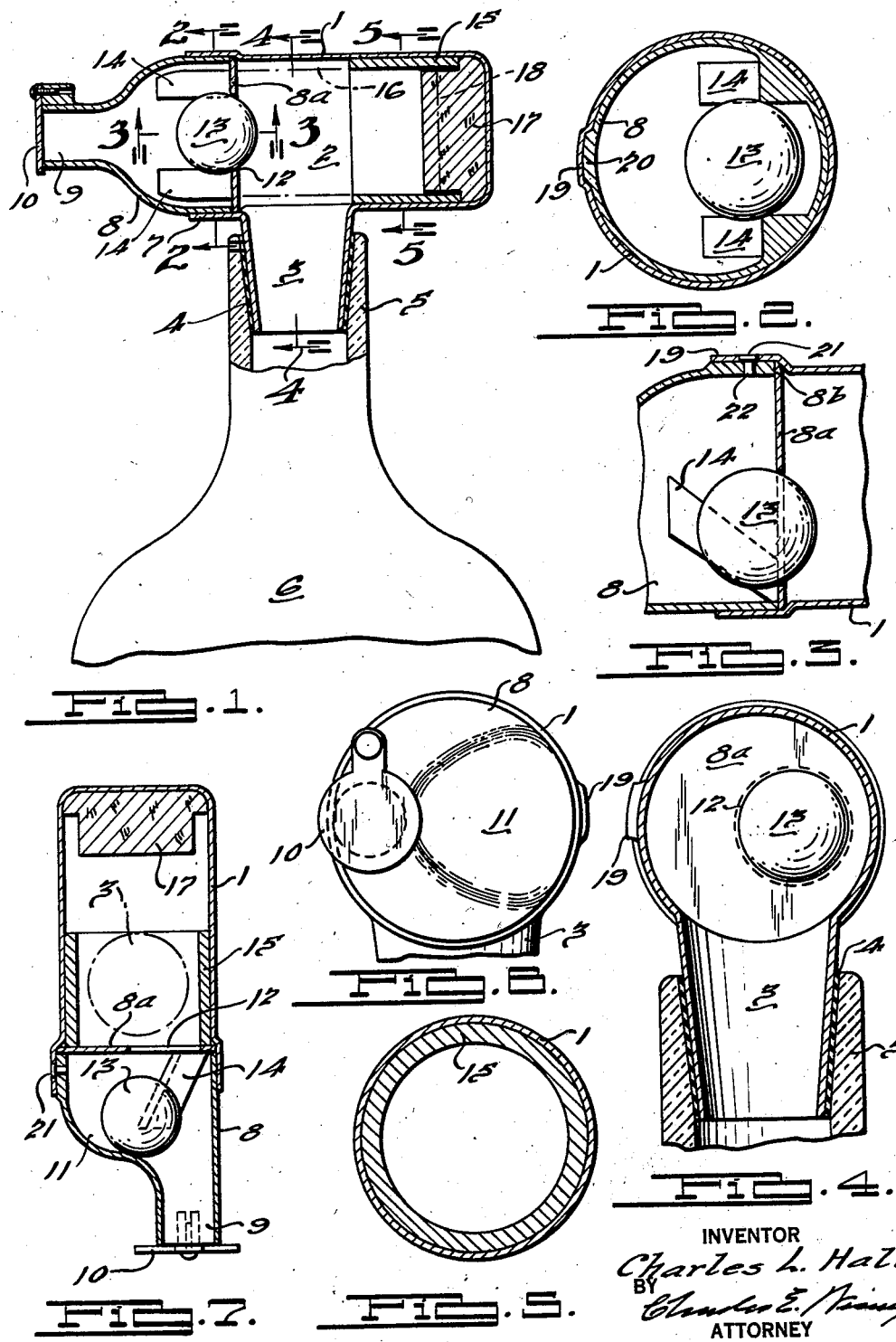

2,306,309

UNITED STATES PATENT OFFICE 2,306,309

AUTOMATIC LIQUID MEASURING DEVICE

Charles L. Hall, Detroit, Mich.

Application January 8, 1941, Serial No. 373,537

7 Claims. (Cl. 221—98)

This invention relates to liquid measuring and dispensing devices, the object being to provide a device having a portion thereof to fit in sealable relation in the neck of a bottle or jug or like container and by tilting and rotating the container to a certain extent a quantity of the liquid is discharged into the device and by further rotation of the device a specific volume of the liquid is discharged therefrom while the container is automatically sealed from the measuring and dispensing device. There are many instances where a measured amount of liquid is required to be dispensed and it may be made of a plastic composition or other desirable material as, for instance, copper.

A further feature and object of the invention is to provide a liquid measuring and dispensing device adaptable to measure and dispense various volumes of liquid as may be required for a particular purpose.

These and other objects and novel features of the invention are hereinafter more fully described and claimed and the preferred form of a liquid measuring and dispensing device embodying my invention is shown in the accompanying drawing in which—

Fig. 1 is an elevation showing a portion of a bottle neck and a longitudinal section of my improved measuring and dispensing device associated therewith.

Fig. 2 is a section taken on line 2—2 of Fig. 1.

Fig. 3 is a section taken on line 3—3 of Fig. 1.

Fig. 4 is a section taken on line 4—4 of Fig. 1.

Fig. 5 is a section taken on line 5—5 of Fig. 1.

Fig. 6 is a front end elevation of the measuring device.

Fig. 7 is a longitudinal section of the measuring device showing the position of the movable parts thereof when turned to pouring position.

The measuring device, according to my invention, involves a body portion 1 of the desired size which provides a cylindrical measuring chamber 2 and on one side the body is provided with a neck portion 3, preferably of a tapered form and having a rubber gasket 4 to fit the neck 5 of the bottle 6 or other container.

In the form of the invention here shown the body is closed at one end and is formed with a flange 7 at the opposite end to receive the base and plate 8a of the valve chamber 8 which is also provided with a discharge spout 9 of a less diameter than the base. It will be observed from Fig. 7 that the spout 9 is at one side of the longitudinal axis of the body 1 and preferably there is a pivoted closure plate 10 for closing the open end of the spout in one position of the device. By forming the discharge spout at one side of the longitudinal center line of the body and of the valve chamber there is provided a recess 11 on one side of the member 8 and there is an opening 12 in the base plate 8a of the valve chamber 8 which may be closed by the ball 13 when the device is being filled with a liquid.

A pair of guideways 14, 14 are formed in the member 8 and lie at an angle to the longitudinal axis of the body and on which the ball rides, the ball rolling to the closed position shown in Fig. 1 when the bottle is rotated to the right in Fig. 1 and on rotation to the left or discharge position the ball rides out on the ways into the recess 11 permitting liquid to pass through the aperture 12 and between the ways 14 and thence through the spout 9. In turning the device to the discharging position the pivoted plate 10 turns by gravity to the position shown in Fig. 7 opening the spout end. This will be understood more clearly from Fig. 6 which is a front end view of the device. It will there be seen that, with the body in the position shown in Figs. 1 and 6, turning the same to the left about the dotted line in Fig. 6 will cause the valve plate 10 to turn to open position as shown in Fig. 7 and the ball will roll on the ways 14 into the recess portion 11 of the valve chamber. Thus by holding the bottle container 6 in a horizontal, or substantially horizontal position, and then turning the same on a horizontal axis the ball will roll to open or to closed position depending upon the direction of rotation. The parts are so arranged that rotation of the container about its longitudinal axis through an arc of approximately twenty-five degrees is sufficient to successively fill and discharge the device.

As previously stated the purpose of the device is to provide for discharge of an accurately measured volume of liquid. It is therefore necessary that no liquid may discharge from the bottle into the measuring device through its inlet 3 when liquid is being poured from the device. For this purpose I provide a sliding cylinder 15 in the chamber 2 which, when the bottle is turned with the spout above a horizontal line, will occupy the position shown in Fig. 1 and, as the device is turned downward from such position through an arc of about twenty-five degrees, the cylinder 15 slides to the position indicated by dotted lines 16 in Fig. 1 and closes the opening of the neck 3 to the body and this movement of the cylinder 15 takes place just before the ball 13 rolls from the opening 12. Therefore, no liquid may pass into the body 1 of the measuring device during the time the liquid is being discharged from the nozzle 9.

The device, as shown in Fig. 1, may be used for dispensing different volumes of liquid. This is accomplished by the provision of an end piece 17 which is formed preferably of cork tightly fitting the chamber 2 and closes the rear end of the cylinder 15 and extends for a distance into the cylinder as shown in Fig. 1. By varying the effective length of the member 17, as by using a filler or plug extending thereinto to a greater extent, a less volume of liquid would be discharged into the chamber 2 or if made less in length, as suggested by dotted lines 18, a greater volume of liquid will be discharged into the chamber 2 and thereafter dispensed through the nozzle 9. Thus a certain size of dispensing device may be arranged to provide for discharge of varying amounts of liquid by using a member like 17 extending the required distance into the cylinder 15. The cylinder 15 slidably fits over the inner end of the member 17.

Preferably the end of the body 1 in which the base of the member 8 fits has an offset portion 19 and the member 8 and base plate 8a each have an offset portion 20 fitting in the offset portion 19 of the body 1. This is provided to properly position the ball and ways therefor in respect to the opening with the recess 11 on the upper side, the device being held with the right hand side of the device shown in Fig. 7 on the lower side and turned on the bottle axis to position for pouring.

With the described arrangement of parts, one or a successive number of specific volumes of liquid may be dispensed by simply rotating the bottle in the hand with this right hand side of the device of Fig. 7 toward the earth and when the nozzle end is turned toward the earth with the device at an angle of about twenty-five degrees to the vertical, the cylinder 15 will move to close the opening 3 and tilting the device a little farther in the same direction will cause the ball to roll to position shown in Fig. 7 opening the outlet 12 of the body 1 and permitting the liquid to discharge from the cylinder 15 to the outlet while the inlet to the body 1 is closed.

It is also desirable that there be an aperture 21 in the offset portion 19 of the body 1 and a similar aperture 22 in the portion 8 of the nozzle which apertures are substantially in registration when the parts are assembled permitting air to flow into the recess 11 when liquid is being discharged through the nozzle. It is to be noted that the base plate is provided with a lug 8b that fits in the offset portion 19 of the body and thus aligns the ball aperture relative to the ways 14 so that the ball may roll thereon to close the aperture while the chamber 2 is being filled.

It is believed evident from the foregoing that the device is of simple and inexpensive construction and while the device is preferably formed of copper it may be of other metal or a material, such as a plastic composition, that is resistant to chemical action of fluids that may be required to be dispensed thereby or the device may be formed of a plastic material, such as Bakelite or the cellulose type of plastic material.

Thus, the device may be adapted for all character of liquids required to be dispensed in various quantity and by use of the cylinder 15 and the plug 17 for varying the capacity of the cylinder 2 one size of device may be used for dispensing different measured volumes of liquid. Therefore it is not necessary to provide different devices to dispense a smaller or a larger measured volume of liquid. It is further believed evident that the various objects and features of the invention are attained by the structure described and that various structural changes may be made without departing from the spirit and scope of the invention as set forth in the appended claims.

Having thus fully described my invention, its utility and mode of operation, what I claim and desire to secure by Letters Patent of the United States is:

1. A liquid measuring and dispensing device comprising a hollow body having a filling chamber and a discharge chamber, an apertured wall separating said chambers, a gravity actuated valve element for closing the aperture in said wall, said filling chamber having a filling neck opening thereto at a point closely adjacent the apertured wall and adapted for introduction in the discharge aperture of a liquid container, a tubular member slidably fitting in the filling chamber and movable in a direction away from the apertured plate by rotation of the container in one direction on a horizontal axis at a right angle to the longitudinal axis of the said chamber to open the neck thereto for the filling operation and on rotation in the opposite direction to open the valve by gravity and cause the tubular member to slide toward the said apertured wall to thereby close the filling aperture and thus discharge only the liquid in the filling chamber.

2. A liquid measuring and dispensing device comprising a hollow body having a filling chamber and a discharge chamber, an apertured wall separating said chambers, a gravity actuated valve element for closing the aperture in said wall, said filling chamber having a filling neck opening thereto at a point closely adjacent the apertured wall and adapted for introduction in the discharge aperture of a liquid container, a tubular member slidably fitting in the filling chamber and movable by gravity in a direction away from the apertured plate by rotation of the container in one direction on a horizontal axis at a right angle to the longitudinal axis of the said chamber for the filling operation and on rotation in the opposite direction to open the valve by gravity and cause the tubular member to slide toward the said apertured wall to thereby close the filling aperture and thus discharge only the liquid in the filling chamber and means for varying the effective depth of the tubular member.

3. A liquid measuring and dispensing device comprising a hollow body having a filling chamber and a discharge chamber in axially aligned relation, an apertured wall extending at right angles to the axis of and separating said chambers, a gravity actuated valve element for opening or closing the aperture in the said wall, said filling chamber having a filling neck opening therethrough at a point closely ajacent the apertured wall and adapted for introduction in sealing relation with the discharge aperture of a liquid container, an open ended tubular member in said filling chamber slidably fitting therein, rotation of the liquid container on a substantially horizontal axis at a right angle to the longitudinal axis of the filling chamber opening or closing the said valve members depending upon the direction of rotation and when turned with the discharge end of said discharge chamber substantially below the level of the intersection of the longitudinal axis of the liquid container and the longitudinal axis of the hollow body, the said valve is caused to open by gravity and the tubular member to slide to position to seal the said filling neck to the filling chamber, and means for varying the capacity of the filling chamber.

4. A liquid measuring and dispensing device comprising a hollow body having a filling chamber and a discharge chamber in axial alignment, an apertured wall extending at a right angle to the axis of and separating said chambers, said discharge chamber having a body portion and a narrow discharge neck extending therefrom, said body portion being substantially of the same diameter as that of the filling chamber and the aperture in said separating wall being at one side of the longitudinal axis of the filling chamber and the discharge neck being substantially aligned with said aperture at one side of the longitudinal axis of the filling chamber and providing a recess on the side of the discharge chamber opposite that occupied by the discharge neck, a ball valve in the discharge chamber, a way in said discharge chamber on which the ball may roll to close the aperture during the filling operation and away from said aperture into the recess of the discharge chamber when the device is turned to discharging position, said filling chamber having a filling neck on one side thereof at a right angle to the longitudinal axis thereof for engaging the discharge aperture of a liquid container, a tubular member slidable in the filling chamber by rotation of the measuring device on an axis at substantially a right angle to its longitudinal axis, rotation of the measuring device in one direction causing the tubular member to slide to the bottom of the filling chamber and simultaneously causing the ball to move and open the discharge neck thereto and rotation in the opposite direction causing said tubular member to close the opening of the filling neck to the filling chamber.

5. A liquid measuring and dispensing device comprising a hollow body having a filling chamber and a discharge chamber, an apertured wall separating said chambers, a gravity actuated valve element for closing the aperture in said wall, said filling chamber having a filling neck opening thereto at a point closely adjacent the apertured wall and adapted for introduction in the discharge aperture of a liquid container, an open ended tubular member slidably fitting in the filling chamber and movable in a direction away from the apertured plate by rotation of the container in one direction on a substantially horizontal axis at a right angle to the longitudinal axis of the said chamber for the filling operation and on rotation in the opposite direction movable toward the said apertured wall to thereby close the filling aperture and also cause the valve to open and thus discharge only the liquid in the filling chamber, and means for varying the volumetric capacity of the filling chamber.

6. A liquid measuring and dispensing device comprising a hollow member having a body portion providing a filling chamber of the desired form in cross section and closed at one end and open at the other, including a discharge chamber having a base portion and a bottom wall fitting in the open end of the filling chamber and a narrow discharge end at one side of the longitudinal axis of the filling chamber, the bottom wall of the said discharge chamber having a discharge aperture substantially aligned with the discharge end thereof, a ball valve for opening or closing the said aperture in the bottom wall of the discharge chamber, a pair of ways in the discharge chamber on which the ball may roll, said ways being inclined to the longitudinal axis of the filling chamber whereby as the nozzle end is turned downwardly on an axis at substantially a right angle to the longitudinal axis of the filling chamber the ball tends to roll to one side of the discharge end of the discharge chamber permitting liquid to flow freely therethrough from the filling chamber and a slidable means in the filling chamber movable toward the apertured plate when in discharge position to seal the filling chamber to the filling neck, the parts being so relatively arranged that in turning the device toward the discharge position the cylindrical member moves to seal the filling aperture prior to the ball being moved to open the said discharge aperture.

7. A liquid measuring and dispensing device comprising a hollow member having a filling chamber and a discharge chamber, a transverse wall separating the same and having an aperture, a gravity actuatable valve for closing or opening the aperture, the filling chamber having a neck portion opening thereto adjacent the wall and adapted for association in sealing relation with the discharge portion of a liquid container, a member of a form in cross section corresponding to the cross sectional form of the filling chamber slidably fitting therein and movable by rotation of the device on the axis of the filling neck to close the filling aperture, the cylindrical member and valve being moved to filling position by turning the device in one direction on the axis of the neck and by rotation in the opposite direction to first seal the said neck to the body and then to open the valve to thereby discharge a measured quantity of liquid from the discharge chamber.

CHARLES L. HALL.